United States Patent [19]
Akita et al.

[11] Patent Number: 5,526,455
[45] Date of Patent: Jun. 11, 1996

[54] CONNECTOR INCLUDING OPPOSING LENS SURFACES, SIDE SURFACES, AND CONTACT SURFACES FOR COUPLING OPTICAL DEVICES

[75] Inventors: Osamu Akita, Osaka; Ichiro Tonai, Yokohama, both of Japan

[73] Assignee: Sumitomo Electric Industries, Ltd., Osaka, Japan

[21] Appl. No.: 305,311

[22] Filed: Sep. 15, 1994

[30] Foreign Application Priority Data

Sep. 17, 1993 [JP] Japan ................... 5-231555

[51] Int. Cl.⁶ .................................................. G02B 6/42
[52] U.S. Cl. ........................ 385/93; 385/33; 385/79
[58] Field of Search .................... 385/31, 33–35, 385/61, 79, 88, 92, 93

[56] References Cited

U.S. PATENT DOCUMENTS

| | | | |
|---|---|---|---|
| 4,531,810 | 7/1985 | Carlsen | 385/61 X |
| 4,534,616 | 8/1985 | Bowen et al. | 385/79 |
| 4,691,985 | 9/1987 | Shank et al. | 385/79 X |
| 4,718,744 | 1/1988 | Manning | 385/79 |
| 4,770,488 | 9/1988 | Shank et al. | 385/79 |
| 4,834,494 | 5/1989 | DeMeritt et al. | 385/79 X |
| 5,440,658 | 8/1995 | Savage, Jr. | 385/79 |

FOREIGN PATENT DOCUMENTS

| | | | |
|---|---|---|---|
| 58-211728 | 9/1983 | Japan . | |
| 1-26611 | 5/1989 | Japan | 385/93 |
| 4-165313 | 11/1992 | Japan . | |

OTHER PUBLICATIONS

English Abstracts of 58-211728 and 4-165313.

Primary Examiner—John D. Lee
Attorney, Agent, or Firm—Beveridge, DeGrandi, Weilacher & Young

[57] ABSTRACT

A connector which can be assembled easily with high accuracy and prevents the increase of the cost of each part includes a distinctively shaped lens constituting an optical system between independent optical devices. The lens is a lens that a support portion is integrally molded with an optically functioning portion as a sleeve for fixing a ferrule put on an end of an optical fiber at a predetermined position to insert the end of the optical fiber. The support portion protrudes along an optical axis of the optically functioning portion.

19 Claims, 6 Drawing Sheets

CONNECTOR INCLUDING OPPOSING LENS SURFACES, SIDE SURFACES, AND CONTACT SURFACES FOR COUPLING OPTICAL DEVICES

BACKGROUND OF THE INVENTION

1. Field of the Invention

The present invention relates to a connector which optically couples between independent optical devices such as optical fibers, semiconductor optical elements, or others, and more particularly to an optical coupling connector for optically coupling an optical fiber and a semiconductor optical element. The semiconductor optical elements include, e.g., a light emitting diode (LED), a laser diode (LD), and a photodiode (PD).

2. Related Background Art

The conventional optical coupling connector comprises a lens constituting an optical system between an optical fiber and an optical element (including a semiconductor optical element), a lens holder for supporting the lens, a ferrule to be put on one end of the optical fiber in order to insert the end of the optical fiber into the module, a sleeve for supporting the ferrule at a predetermined position, and a stem for mounting an optical element to face the optical fiber through the lens.

Each part is adjusted so that its central axis matches with an optical axis of the lens, and thereafter the parts are fixed to each other.

SUMMARY OF THE INVENTION

One of the objects of the present invention is to provide the distinctive structure of an optical coupling connector in order to omit a process of adjusting the position of parts to be optically coupled and to obtain various advantages.

One of the features of an optical coupling connector according to the present invention is the structure of a module which optically couples between independent optical devices, e.g., an optical fiber and an optical element including a semiconductor optical element. In general one end of the optical fiber is supported by a ferrule and the optical element mounted on a stem.

The connector comprises a ferrule to be put on one end of the optical fiber in order to insert the end of the optical fiber into the connector, a stem on which the optical element to be placed opposing to the end of the optical fiber is mounted at a predetermined position, a distinctively shaped lens constituting an optical system between the end of the optical fiber and the optical element. The distinctively shaped lens comprises at least an optically functioning portion defined by a first lens face opposing the end of the optical fiber and a second lens face opposing to the optical element, and a support portion forming the periphery of the optically functioning portion and integrally formed with the optically functioning portion. In particular, the support portion of the optically functioning portion protrudes at least towards the optical fiber side along an optical axis of the optically functioning portion and forms a hollow first tube having an opening. The first tube is molded so as to support the ferrule put on the end of the optical fiber and so that an optical axis of the optically functioning portion is matched with an central axis of the optical fiber. The support portion of the distinctively shaped lens can form a hollow second tube having an opening, protruding towards the optical element side along an optical axis of the optically functioning portion (the second tube is molded so as to support the optical element and so that a face of the optical element opposing the first lens face is located on the optical axis of the lens portion. Thus, the support portion includes the first tube and/or the second tube.

In other words, the distinctively shaped lens comprises a optically functioning portion defined by two lens faces: a lens face (a first lens face) on the optical fiber side and a lens face (a second lens face) on the optical element side, and a support portion closely surrounding the periphery of the lens portion, made of the same material as the lens portion. The support portion is integrally molded into a shape protruding to the optical fiber side in parallel with the optical axis of the optically functioning portion. As an example of the modified lens, the lens is molded into a shape protruding to the optical element side in parallel with the optical axis of the lens portion. As a material composing the lens, for example, transparent resin, which is resin capable of transmitting light 0.5 µm–2.0 µm, in a view of easiness of process, optical glass or others is suitable. In particular, light of 0.5 µm–2.0 µm includes visible radiation (the visible region).

The sectional form of the first and second tubes is not limited as long as the optical devices to be optically coupled are supported with their axes adjusted. The possible sectional form is, for example, circular, elliptical, square, rectangular, polygon, polyhedron (including a shape partially dented) and others.

The support portion of the distinctively shaped lens is integrally molded into a cylinder to support an optical device such as an optical fiber, a ferrule put on one end of the optical fiber or others at a predetermined position. Accordingly, the distinctively shaped lens can be utilized as an optical connector which optically couples the same kind of optical devices (e.g., one optical fiber and another optical fiber, or one optical element and another optical element), or the different kind of optical devices (e.g., an optical fiber and an optical element). Of course, one end of each optical fiber may be supported by a ferrule.

For the suitable shape of the optically functioning portion of the lens of distinctive lens, at least one lens face on the ferrule inserting side (towards the optical fiber) and the lens face on the optical element side has a predetermined curvature. There are a case that the whole surface of the optically functioning portion is processed to have a predetermined curvature (spherical lens), a case that a curvature in the central portion of the lens face and a curvature in the periphery of the lens face are different (spherical lens), and a case that only one of the lens faces is spherical or aspherical. Further, the optically functioning portion may be composed by two flat faces and the refractive index profile is given to the lens portion so that the refractive index in the central portion is larger than the refractive index in the periphery portion, which also accomplishes the lens function.

The distinctively shaped lens comprises positioning means in order to fix the ferrule and/or the optical element (an optical element package in which the optical element is mounted at a predetermined position) with a desired accuracy. That is, in order to fix the ferrule, a ferrule contact face is placed on the inner surface of the first tube on the ferrule inserting side. Further, in order to fix the stem on which the optical element is mounted, especially in the case that the second tube of the lens is molded into a cylinder, a tapered face is placed at the inner surface of the second tube on the optical element side, and the edge of the stem is touched (pressed) against the tapered face to be positioned. In this case, the shape of the stem and the lens should be cylindrical (including a hollow cylinder). Further, in the case that the stem can be molded into an arbitrary shape like a resin package (it is very effective when the tube of the lens is molded into a shape other than a cylinder), a positioning projection is integrally molded at the end of the second tube on the optical element side, projecting along the optical axis of the lens. The projection is inserted in a positioning hole provided on the surface of the stem, which completes the positioning.

Next, referring to FIG. 1, words used in this specification will be explained hereinbelow in order to specify the distinctive structure of a lens of the present invention.

FIG. 1 shows a sectional form of the distinctively shaped lens. A support portion 55 is processed into a distinctive shape, that is, the support portion 55 includes at least tubes 50a and 50b. An optical axis of the optically functioning portion is defined by a line shown as A, and substantially matches with a central axis of the optically functioning portion. The support portion of the lens protrudes to the optical fiber side and/or the optical element side (in figures, the left side is the optical fiber side and the right side is the semiconductor optical device side) in parallel with the optical axis. Accordingly, the support portion denoted by 50a in FIG. 1 is defined as a first tube and the support portion denoted by 50b is defined as a second tube.

The optically functioning portion 50 is defined by two lens faces 51 and 52. In this specification, 51 is defined as a first lens face (a lens face on the optical fiber side) and 52 is defined as a second lens face (a lens face on the optical element side). 500a denotes internal surfaces of the first tube 50a of the lens and 500b denotes an internal surface of the second tube 50b of the lens. 501 denotes an edge of the second tube and this edge includes a face perpendicular to the optical axis A.

Accordingly, the connector of the invention comprises; an optically functioning portion 50, called a lens portion in the specification, defined by a first lens face 51 and a second lens face 52, the first and second lens surfaces 51 and 52 opposing to each other; and a first joint portion 50a, called a first tube of the support portion 55 in the specification, continued from the lens portion 50 and constituting a first space for accommodating a ferrule (not shown), the first space being defined by: a first side surface 500a on the first lens face side protruding along the optical axis A and forming a hollow tube having an opening; a first contact surface 54a, called a ferrule contact face in the specification, continued from the first side surface 500a; and a spacing side surface 54b continued from the first contact surface 54a and jointing to said first lens face 51. The connector of the invention further comprises a second joint portion 50b, called a second tube of the support portion 55 in the specification, continued from the lens portion 50 and constituting a second space for accommodating at least a part of said optical device, the second space being defined by: the second lens face 52; and a second side surface 500b continued from the second lens face 52, the second side surface 52 on the second lens face side protruding along an optical axis A and forming a hollow tube having an opening. In particular the second joint portion 50b has means for positioning the stem at the edge 501, and the means includes a second contact face. The second contact face may be a tapered face 53 having a predetermined angle with respect to the optical axis A (see FIG. 2). Alternatively the second contact face may be a face perpendicular to the optical axis A so as to have a projection 11a (see FIG. 12).

As a result, the first and second joint portion 50a and 50b of the connector function as an alignment sleeve.

The connector of the present invention comprises at least a distinctively shaped lens that the conventional sleeve and lens are integrally molded from optical glass or others. Consequently, there is no need to use a sleeve, a lens holder and a lens which are originally separate parts. The sleeve, lens holder and lens are not needed to be formed into the stacked structure or the piled-up structure.

The distinctively shaped lens is constructed such that means for positioning a ferrule and/or means for positioning an optical element (including an optical element package in which the optical element is mounted on a predetermined position) are integrally molded in the same manner as the first and second tubes. Therefore, a process which requires high accuracy such as a process of aligning axes can be omitted from the assembling processes.

In a case of using transparent resin, the connector can be bonded by an adhesive or ultrasonic welding, so that the connector can be molded into an arbitrary shape.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
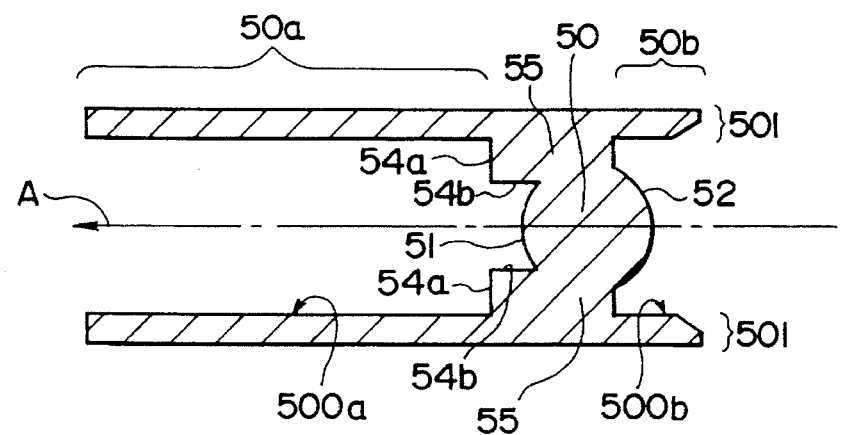
FIG. 1 is a view illustrating each part of a distinctively shaped lens, constituting an optical system of an optical coupling connector according to the present invention.

The embodiments of the present invention will be explained hereinbelow, referring to FIG. 2-FIG. 12. The same components are represented by the same reference numerals and the repetitive description on the same components is omitted.

Figure 2:
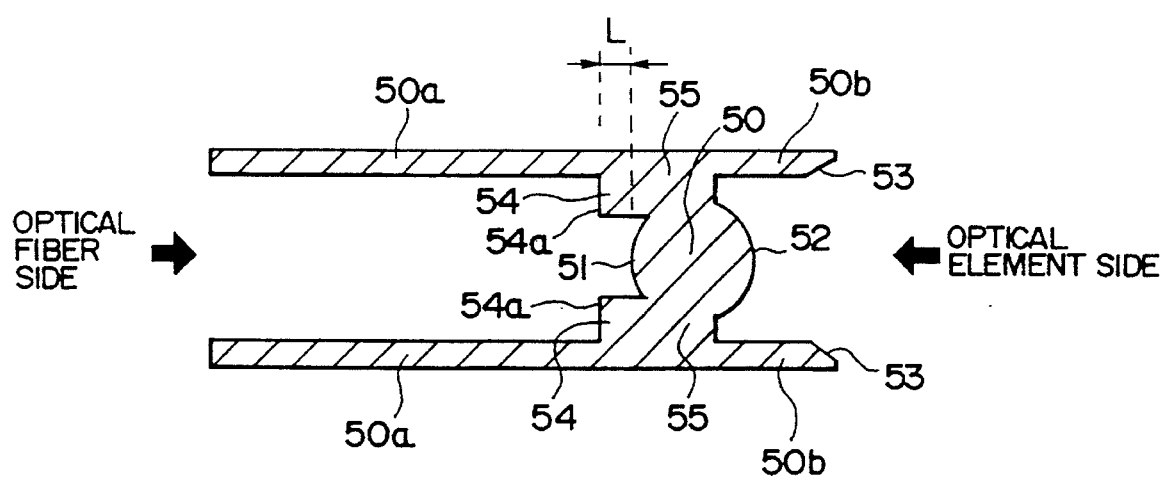
FIG. 2 is a sectional view showing the structure of a distinctively shaped lens constituting an optical system of an optical coupling connector according to the present invention.
Figure 3:
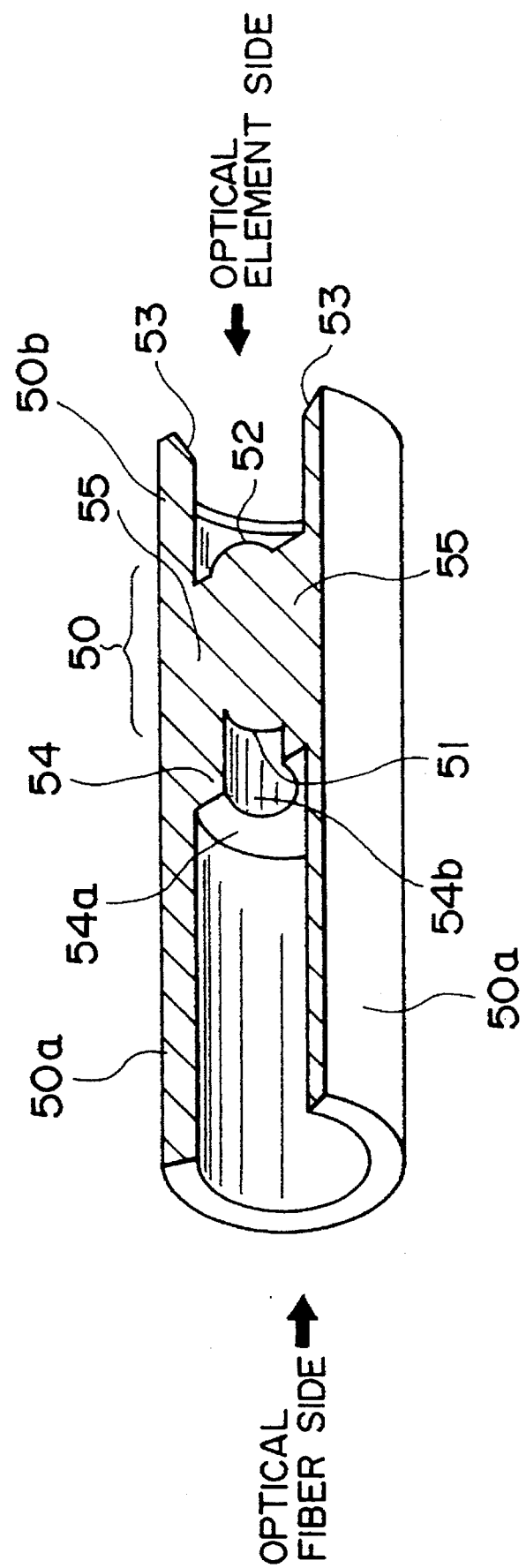
FIG. 3 is a sectional perspective view showing the structure of a distinctively shaped lens constituting an optical system of an optical coupling connector according to the present invention.

An optical coupling connector according to the present invention, as shown in FIG. 2 and FIG. 3, comprises a distinctively shaped lens having at least a first tube (a first joint portion) which works as a conventional sleeve (the first tube 50a which works as a sleeve and a lens portion 50 as an optically functioning portion are integrally molded), which is formed by pressing optical glass (e.g., silica glass, borosilicate glass: material No. BK-7 etc.) or a resin capable of transmitting light of 0.5 μm–2.0 μm (e.g., epoxy etc.) with a metal mold (not shown). Note that in this embodiment, a second tube 50b (a second joint portion) for fixing a stem on which a semiconductor optical element is mounted on a predetermined position is also integrally molded. The light of 0.5 μm–2.0 μm includes visible radiation (the visible region).

The shape of the first and second tubes 50a and 50b of the lens is molded basically into a cylinder with opened front and rear faces (on the optical fiber side and the optical element). A part of the support portion 55 for supporting a lens portion 50 is, as its appearance shown in FIG. 3, integrally molded with the internal surfaces 500a and 500b of the first and second tubes 50a and 50b. A positioning member 54 is provided in the support portion 55 (integrally molded) to determine a distance L between the first lens face 51 and one end face of the optical fiber. As shown in FIGS. 1 and 2, the positioning member 54 is defined by a first contact face 54a and a spacing side face 54b. The ferrule put on one end of the optical fiber is inserted into the first tube 50a so that the end face of the ferrule comes in contact with a contact face 54a, which completes a part of the process of assembling a connector and adjusting axes. Note that the ferrule is a support member put on one end of the optical fiber in order to insert the optical fiber into the connector.

In particular, the first tube 50a is molded to have an inner diameter (e.g., inner diameter of 2.502 mm) slightly larger than an outer diameter (e.g., outer diameter of 2.499 mm) of a ferrule which contributes to the positioning of one end of the optical fiber. The internal surface of the first tube 50a which is an inserting path of the ferrule is continuously and integrally molded from the end to the contact face 54a with high precision. On the center of the support portion 55, the lens portion 50 defined as a ball lens by the first lens face 51 and the second lens face 52 is integrally molded with the support portion 55. An annular face 54a of the positioning member 54 of the support portion 55 provided on the ferrule inserting side, which opposes one end face of the ferrule is, as shown in FIG. 2, integrally molded as a contact face 54a which comes in contact with one end face of the ferrule. The optimum distance L (see FIG. 1) between the contact face 54a and the first lens face 51, that is the distance at which optical coupling is the highest, is determined by the experiment of alignment in advance. In other words, this distance is achieved and ensured easily with high precision by a metal mold when the lens is molded.

Figure 4:
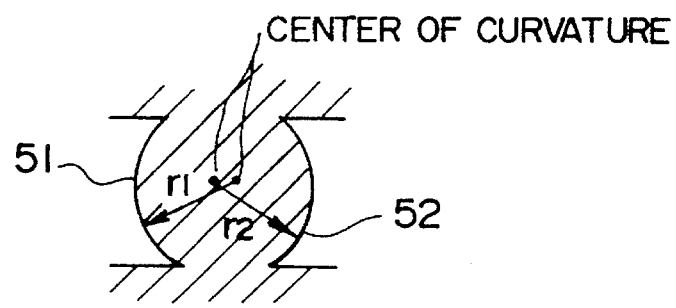
FIG. 4 is a sectional view showing the first embodiment of the structure of a lens portion in a distinctively shaped lens shown in FIG. 2 and FIG. 3.
Figure 5:
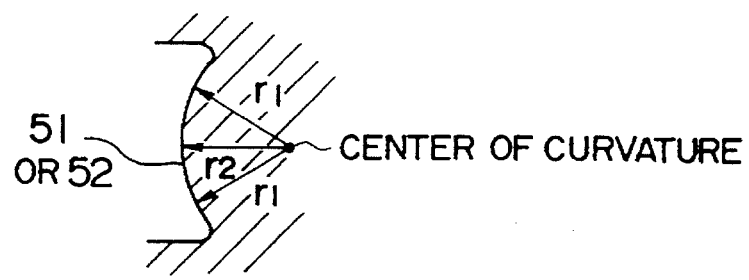
FIG. 5 is a sectional view showing the second embodiment of the structure of a lens portion in a distinctively shaped lens shown in FIG. 2 and FIG. 3.
Figure 6:
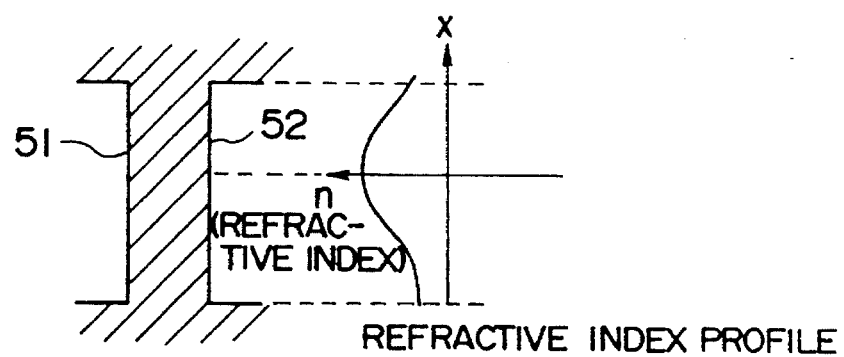
FIG. 6 is a sectional view showing the third embodiment of the structure of a lens portion in a distinctively shaped lens shown in FIG. 2 and FIG. 3.

As the first embodiment shown in FIG. 4, the lens portion 50 of the distinctively shaped lens has a first lens face 51 having a radius $r_1$ of curvature and a second lens face 52 having a radius $r_2$ of curvature. If $r_1=r_2$, the lens portion 50 works as a ball lens shown in FIG. 1 and FIG. 2. If $r_1 \neq r_2$, the lens portion 50 can be designed to an aspherical lens. As the second embodiment shown in FIG. 5, the lens portion 50 can be an aspherical lens, which does not have a uniform curvature but has a different curvature in the center and periphery ($r_1 \neq r_2$). As the third embodiment, the lens portion 50 can have a flat surface not a spherical surface. In this case, it is needless to say that the lens portion 50 having a refractive index profile shown in FIG. 6 (GRIN (graded index) glass) can be used.

Figure 7:
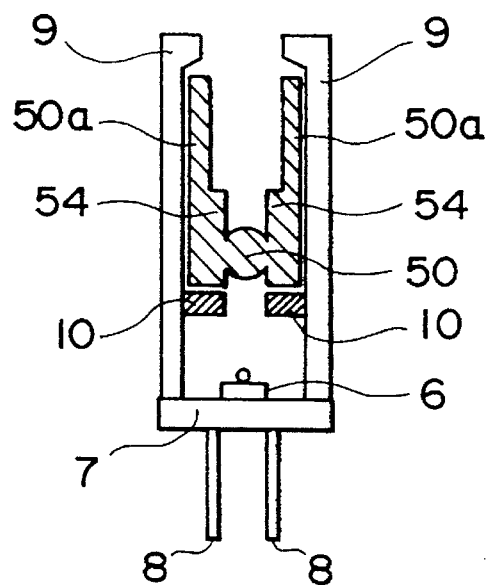
FIG. 7 is a sectional view showing the first embodiment of the structure of the optical coupling connector according to the present invention before a ferrule is inserted.
Figure 9:
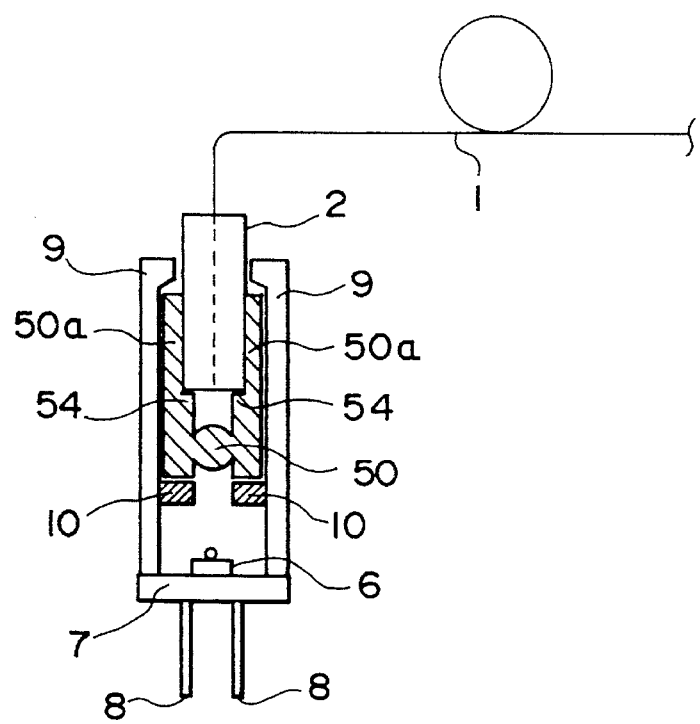
FIG. 9 is a sectional view showing the first embodiment of the structure of the optical coupling connector according to the present invention after a ferrule is inserted.

The first embodiment of producing an optical coupling connector using a distinctively shaped lens made of optical glass is shown in FIG. 7. If the lens (in this embodiment, the second tube 50b on the semiconductor optical device side is not molded) is integrally molded by pressing optical glass with a metal mold and fixed in a holder 9 as a housing, the optical coupling connector can be produced easily. Note that the use of a connector that the ferrule 2 is put on one end of an optical fiber 1 and inserted into the connector is shown in FIG. 9. The connector can completely achieve the axial alignment between the fiber 1 supported by the ferrule 2 and the lens portion 50.

Figure 11:
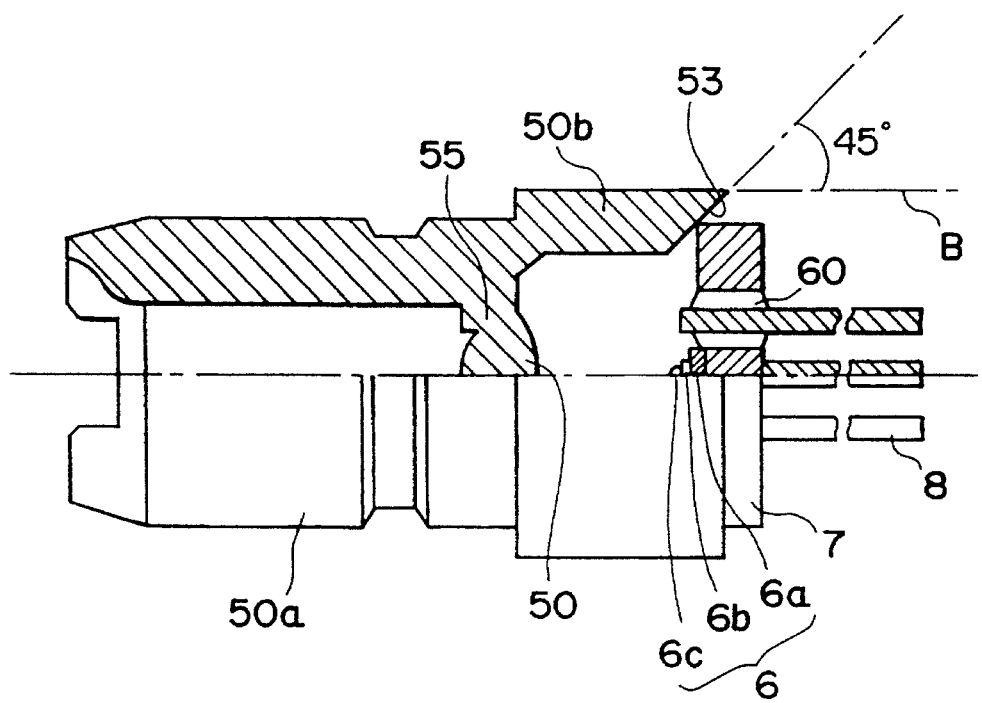
FIG. 11 is a partially sectional view showing a distinctively shaped lens constituting an optical system of an optical coupling connector according to the present invention and particularly to the first embodiment of the structure of means for positioning a stem on which an optical element is mounted.

In this embodiment, the holder 9 is made of metal or resin and formed into a cylinder with opened ends (the end to which the ferrule is inserted and the end to which the stem 7 is adhered in FIG. 7). The circular stem 7 (an optical device package or others) is adhered to one opened end of the holder 9 to avoid dust. A semiconductor optical device 6 comprising a semiconductor light emitting device or a semiconductor light receiving device is placed on a back surface (inside of the connector) of the stem 7. A plurality of stem pins 8 for electrically connecting the semiconductor optical device 6 with an external power supply (not shown) or others are inserted into the stem 7. These stem pins 8 are fixed at the stem 7 by sealing tubes 60 (FIG. 11). The connector can completely achieve the axial alignment between the fiber 1 supported by the ferrule 2 and the device 6 mounted on the stem 7.

A substantially annular lens fixing portion 10 is provided on the inner surface (a surface touching with the lens) of the holder 9, protruding perpendicular to the inner surface of the holder 9. The lens fixing portion 10 is inserted into the holder 9 by press fitting or others and fixed at the predetermined position after the lens is inserted into the holder 9 (inserted from the lower side of FIG. 7). The use of the holder 9 is because it is hard to directly bond the distinctively shaped lens with the stem 7, which requires the holder 9 made of metal or resin be bonded to the stem 7.

Figure 8:
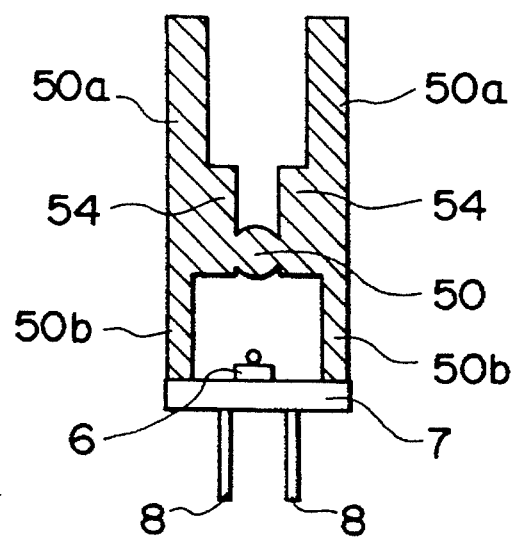
FIG. 8 is a sectional view showing the second embodiment of the structure of the optical coupling connector according to the present invention before a ferrule is inserted.
Figure 10:
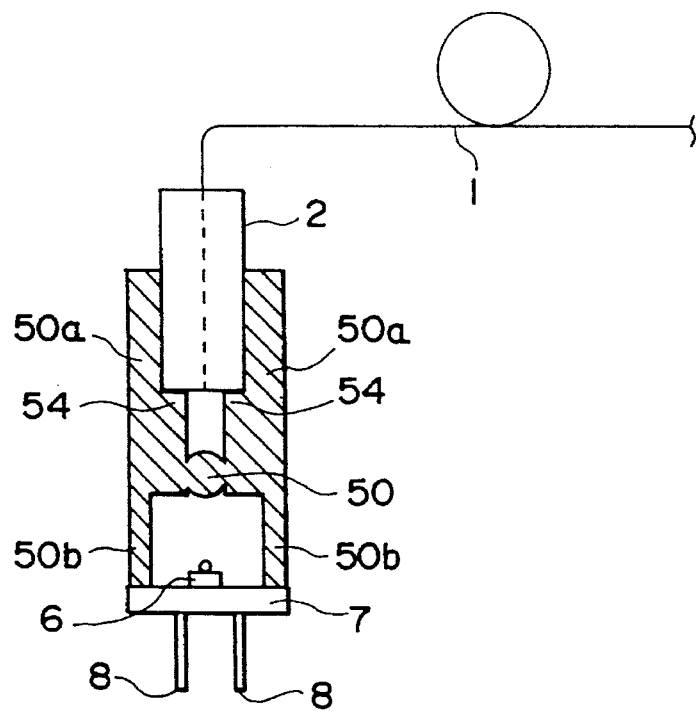
FIG. 10 is a sectional view showing the second embodiment of the structure of the optical coupling connector according to the present invention after a ferrule is inserted.

The second embodiment of producing an optical coupling connector using a distinctively shaped lens made of transparent resin is shown in FIG. 8. If the distinctively shaped lens is integrally molded by pressing transparent resin with a metal mold and one opened end of the lens is bonded directly or welded to a back surface (a surface located inside the connector and on which an optical device 6 is mounted) of a stem 7, the optical coupling connector can be produced easily. In this case, the holder 9 can be omitted. Thus, when the distinctively shaped lens is made of transparent resin, one opened end of the lens can be bonded easily to the stem 7 by an adhesive or ultrasonic welding. Therefore, the connector can be molded into a shape shown in FIG. 8. The use of a connector where the ferrule 2 is put on one end of an optical fiber 1 and inserted into the connector is shown in FIG. 10.

As described above, in the case of the semiconductor optical device 6 comprising a semiconductor light emitting device, light is collected by a lens portion 50 upon the emission of the semiconductor optical device 6 (light diffusion is prevented) and thereafter light is incident on one end face (an end face opposing to the optical device 6 through the lens portion 50) of the optical fiber 1. On the other hand, in the case of the semiconductor optical device 6 comprising a semiconductor light receiving device, light from the end face of the optical fiber 1 is collected by the lens portion 50 and thereafter light is incident on the semiconductor optical device 6 with a high rate of light gathering. If the quantity of light is sufficient, the lens portion 50 may have a function of widening light.

As described above, in the distinctively shaped lens, the support portion 55 surrounding the lens portion 50 closely, which works as a sleeve for fixing the ferrule 2 is integrally molded with the lens portion 50. With this structure, there is no need to form the sleeve, lens holder and lens which are originally separate parts into the stacked structure or the piled-up structure. Shift of the central axis of each part can be lowered very easily with the omission of the aligning process. The cost of each part can be suppressed.

Further, when the fixing position of each part of the connector is adjusted, dispersion of adjustment accuracy is significantly lowered. Therefore, the problem of demands of increase of the number of manufacturing steps, delay of manufacturing time, highly advanced technique, and parts with high accuracy can be solved. It is apparent that as the distinctively shaped lens in which the functions of the conventional sleeve and lens are integrated is utilized in the connector, the number of parts is significantly decreased, which lowers the cost of production.

Figure 12:
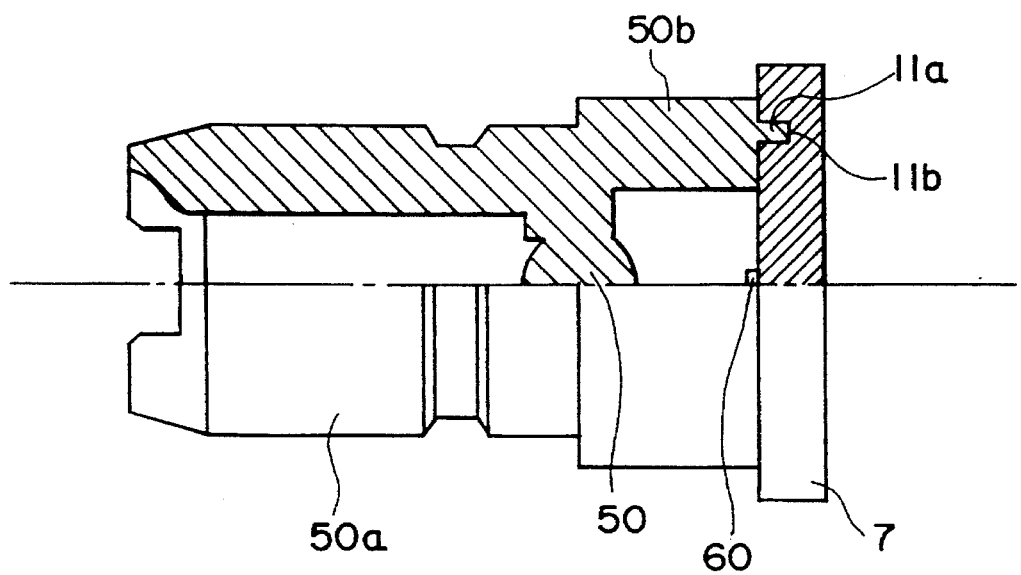
FIG. 12 is a partially sectional view showing a distinctively shaped lens constituting an optical system of an optical coupling connector according to the present invention and particularly to the second embodiment of the structure of means for positioning a stem on which an optical element is mounted.

Next, referring to FIG. 11 and FIG. 12, means of positioning a stem 7 (an optical coupling device package or others) at one opened end of the lens in the case of the distinctively shaped lens (integrally molded with transparent resin) of the second embodiment will be explained. FIG. 11 shows an optical coupling connector on a transmission side on which a semiconductor light emitting device (LED 6b) is mounted. FIG. 12 shows an optical coupling connector on a reception side on which a semiconductor light receiving device (PD 60) is mounted.

In the first embodiment shown in FIG. 11, the distinctively shaped lens is integrally molded using transparent resin (e.g., polycarbonate) as a major material. The first and the second tubes are molded into a cylinder. A tapered face having a 45° angle against an optical axis (in FIG. 11, a line B is parallel to a line A denoting the optical axis) of the lens portion 50 is formed at the inner surface of one end of the second tube 50b of the distinctively shaped lens. The LED 6 is mounted on the back surface (a face located inside the connector) of the circular stem 7 using AuSn eutectic soldering. In FIG. 11, 6a is a submount for excellently mounting an LED chip 6b on the stem 7, and 6b is an LED chip, and 6c is a microball to collimate light emitted from the LED chip 6b. When the LED is mounted on the stem 7, the LED is fixed within a range of +5 μm from the central axis (an axis matched with the optical axis A of the lens portion 50) of the stem 7 using an image recognition technique. The lens portion 50 is a spherical lens in order to decrease aberration.

On the other hand, in the second embodiment shown in FIG. 12, in the same manner as the first embodiment, a distinctively shaped lens integrally molded into a cylinder using transparent resin as a major material is utilized. A positioning projection 11a is provided in parallel with an optical axis of the lens portion 50 at an end of the second tube 50b, that is, a surface perpendicular to an optical axis of the lens portion 50. The PD 60 is fixed on the stem 7 (a plastic package in which a wiring pattern is formed using a molded interconnection device) using SuPb soldering. A positioning hole 11b for storing the positioning projection 11a is provided on the back surface of the stem 7. When the PD 60 is mounted on the stem 7, the PD 60 is fixed within a range of +5 μm from the central axis (a central axis of the stem when the stem 7 is placed at the end of the second tube 50b, and this axis matches with the optical axis of the lens portion 50) of the stem 7 using an image recognition technique. A spherical lens is used as the lens portion 50.

In the case of the above-described first embodiment, the distinctively shaped lens is integrally molded so that the central axes of the cylindrical first and second tubes 50a and 50b to which the ferrule 2 put on the end of the optical fiber 1 is inserted, the lens portion 50, and the positioning tapered face 53 are matched with each other. Therefore, the substantially cylindrical package such as a CD stem, TO-18, T0-46 etc. which is widely used can be positioned only by pressing against the tapered face 53 of the distinctively shaped lens. Further, when the semiconductor optical device 6 is mounted on the stem 7, the semiconductor optical device 6 is arranged easily on the stem 7 where its axis matches with the optical axis A of the lens portion 50 with high precision, e.g., using an image recognition technique.

In each of the above-described embodiments, the optical coupling connector using the substantially cylindrical and distinctively shaped lens, the circular stem 7, the substantially cylindrical holder 9 and others has been shown. However, it is needless to say that their shape and structure are not limited to the above embodiments as long as the same effects are obtained.

As described above, according to the present invention, a sleeve, a lens holder and a lens which are separate parts are not needed to be formed into the stacked structure or the piled-up structure. Precision of a process of matching a central axis of each part can be improved easily. The significant effect is that the cost of each part can be suppressed. When the optical coupling connector is produced, each part is integrally molded, so that the aligning process is not required. There are effects that the manufacturing facility is simplified and that the manufacturing process is shortened.

In other words, dispersion of adjustment accuracy of each part in the connector is lowered. Consequently, there is the distinctive affect such that the problem of demands of increase of the number of manufacturing steps, delay of manufacturing time, highly advanced technique, and parts with high accuracy can be solved. Further, the another distinctive affect is that the number of parts is significantly decreased, which lowers the cost of production.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No.231555/1993 filed on Sep. 17, 1993 is hereby incorporated by reference.

What is claimed is:

1. A lens to be located between an optical fiber and an optical device, comprising:
   an optically functioning portion defined by first and second lens surfaces, said first and second lens surfaces opposing each other; and
   a first joint portion continued from said optically functioning portion and constituting a first space for accommodating one end of said optical fiber, said first space being defined by:
   a first side surface on the first lens surface side protruding along the optical axis of said optically functioning portion and forming a hollow tube having an opening, whereby said first side surface functions so as to prevent said optical fiber from moving in a vertical direction with respect to the optical axis of said optically functioning portion;
   a first contact surface continued from said first side surface and adapted so as to position the end of said optical fiber; and
   a spacing side surface continued from said first contact surface and joining to said first lens surface, whereby said spacing side surface functions so as to define the distance between said first lens surface and the end of said optical fiber.

2. A lens according to claim 1, wherein a major material of said lens is one of optical glass or resin capable of transmitting light of 0.5 μm–2.0 μm.

3. A lens according to claim 1, wherein said optically functioning portion works as a spherical lens with said first lens surface and said second lens surface having a predetermined curvature.

4. A lens according to claim 1, wherein said optically functioning portion works as an aspherical lens with said first lens surface and said second lens surface.

5. A connector for coupling optical devices, comprising:
   said lens according to claim 1;
   a housing for accommodating said lens, said housing formed into a tube with opened ends thereof, whereby an inner surface of said housing is directly in contact with said first joint portion of said lens and functions so as to prevent said lens from moving in a vertical direction with respect to the optical axis of said optically functioning portion;
   a stem on which said optical device to be placed opposing to the end of said optical fiber is mounted at a predetermined position, said stem contacting with one opened end of said housing; and
   means for positioning said lens, said means fixed on the inner surface of said housing.

6. A connector according to claim 5, wherein a major material of said lens is one of optical glass or resin capable of transmitting light of 0.5 μm–2.0 μm.

7. A connector according to claim 5, further comprising a ferrule to be put on one end of an optical fiber in order to insert the end of said optical fiber into said first joint portion of said lens.

8. A lens to be located between an optical fiber and an optical device, comprising:
   an optically functioning portion defined by first and second lens surfaces, said first and second lens surfaces opposing each other;
   a first joint portion continued from said optically functioning portion and constituting a first space for accommodating one end of said optical fiber, said first space being defined by:
   a first side surface on the first lens surface side protruding along the optical axis of said optically functioning portion and forming a hollow tube having an opening, whereby said first side surface functions so as to prevent said optical fiber from moving in a vertical direction with respect to the optical axis of said optically functioning portion;
   a first contact surface continued from said first side surface and adapted so as to position the end of said optical fiber; and
   a spacing side surface continued from said first contact surface and joining said first lens surface, whereby said spacing side surface functions so as to define the distance between said first lens surface and the end of said optical fiber; and
   a second joint portion continued from said optically functioning portion and constituting a second space for accommodating at least a part of said optical device, said second space being defined by:
   said second lens surface; and
   a second side surface continued from said second lens surface, said second side surface on the second lens surface side protruding along an optical axis of said optically functioning portion and forming a hollow tube having an opening, whereby said second side surface functions so as to define the distance between said second lens surface and said optical device.

9. A lens according to claim 8, wherein said second side surface includes a second contact surface having a predetermined angle with respect to the optical axis of said optically functioning portion, whereby said second contact surface functions so as to prevent said optical device from moving in both vertical and horizontal directions with respect to the optical axis of said optically functioning portion.

10. A lens according to claim 8, wherein said second side surface includes a second contact surface having a projection projecting along the optical axis of said optically functioning portion, whereby said projection functions so as to prevent said optical device from moving in a vertical direction with respect to the optical axis of said optically functioning portion.

11. A lens according to claim 8, wherein a major material of said lens is one of optical glass or resin capable of transmitting light of 0.5 μm–2.0 μm.

12. A lens according to claim 8, wherein said optically functioning portion works as a spherical lens with said first lens surface and said second lens surface having a predetermined curvature.

13. A lens according to claim 8, wherein said optically functioning portion works as an aspherical lens with said first lens surface and said second lens surface.

14. A connector for coupling optical devices, comprising:
   said lens according to claim 8; and
   a stem on which said optical device to be placed opposing the end of said optical fiber is mounted at a predetermined position, said stem being in contact with said second joint portion.

15. A connector according to claim 14, wherein said second side surface includes a second contact surface having a predetermined angle with respect to the optical axis of said optically functioning portion, whereby said second contact surface functions so as to prevent said optical device from moving in both vertical and horizontal directions with respect to the optical axis of said optically functioning portion.

16. A connector according to claim 14, wherein said second side surface includes a second contact surface having a projection projecting along the optical axis of said optically functioning portion, and wherein said stem has a positioning hole for inserting said projection, whereby said projection functions so as to prevent said optical device from moving in a vertical direction with respect to the optical axis of said optically functioning portion.

17. A connector according to claim 14, wherein a major material of said lens is one of optical glass or resin capable of transmitting light of 0.5 μm–2.0 μm.

18. A connector according to claim 14, further comprising a ferrule to be put on one end of an optical fiber in order to insert the end of said optical fiber into said first joint portion of said lens.

19. A connector according to claim 14, further comprising a housing for accommodating said lens, said housing being formed into a tube with opened ends thereof, whereby an inner surface of said housing is directly in contact with said first joint portion of said lens and functions so as to prevent said lens from moving in a vertical direction with respect to the optical axis of said optically functioning portion.

* * * * *